US012403570B2

(12) United States Patent
Vizachero

(10) Patent No.: US 12,403,570 B2
(45) Date of Patent: Sep. 2, 2025

(54) TORQUE TOOL SYSTEM

(71) Applicant: Chris Vizachero, Wixom, MI (US)

(72) Inventor: Chris Vizachero, Wixom, MI (US)

( * ) Notice: Subject to any disclaimer, the term of this patent is extended or adjusted under 35 U.S.C. 154(b) by 0 days.

(21) Appl. No.: 17/400,439

(22) Filed: Aug. 12, 2021

(65) Prior Publication Data

US 2022/0048168 A1 Feb. 17, 2022

Related U.S. Application Data

(60) Provisional application No. 63/065,139, filed on Aug. 13, 2020.

(51) Int. Cl.
*B25B 23/142* (2006.01)

(52) U.S. Cl.
CPC ...... *B25B 23/1427* (2013.01); *B25B 23/1425* (2013.01)

(58) Field of Classification Search
CPC ............ B25B 23/1425; B25B 23/1427; B25B 23/141; B25B 23/16
USPC .......... 81/477, 474, 472, 467, 478, 481, 479
See application file for complete search history.

(56) References Cited

U.S. PATENT DOCUMENTS 5,890,406 A * 4/1999 Thorn ................ B25B 23/1427 81/479
7,069,827 B1 * 7/2006 Hsieh .................. B25B 23/1427 81/476
10,688,629 B2 6/2020 Barzelay et al.
2007/0119269 A1 * 5/2007 Anjanappa .......... B25B 23/1425 73/862.21
2010/0170370 A1 * 7/2010 Yokoyama .............. B25B 23/14 81/479
2012/0132042 A1 * 5/2012 Bruce ................. B25B 23/1425 81/479
2018/0071901 A1 * 3/2018 Silha ................... B25B 23/1425

FOREIGN PATENT DOCUMENTS

DE 0788862 A1 * 8/1997 ......... B25B 23/1427

OTHER PUBLICATIONS

Standard Interchangeable Drive Preset Torque Wrenches, 4 pages https://belknapioois.com/presei-torque-wrenches/standard-interchangeable-drive-preset-torque-wrenches/.

* cited by examiner

*Primary Examiner* — David B. Thomas
(74) *Attorney, Agent, or Firm* — Leason Ellis LLP

(57) ABSTRACT

By way of non-limiting example, the present approaches use a combination of at least a load cell sensor and a strain gauge sensor to provide near real time and real time data to a microprocessor for evaluation of the torque applied to a work piece. The microprocessor is further configured to communicate data obtained from the at least two sensors to a remote data monitoring, storage or analysis platform. In one or more implementations, the data obtained by the microprocessor from the at least two sensors include the ability to track if any adjustments are erroneously made to the torque application tool itself or if the torque application tool is configured to send an incorrect signal that corresponds to the amount of torque applied to a workpiece.

9 Claims, 4 Drawing Sheets

TORQUE TOOL SYSTEM

CROSS REFERENCE TO RELATED APPLICATION

The present application claims the benefit of U.S. patent application Ser. No. 63/065,139, filed Aug. 13, 2020, which is hereby incorporated by reference in its entirety.

FIELD OF THE INVENTION

The present invention is directed to systems, methods and computer implemented products for improved torque tools.

BACKGROUND OF THE INVENTION

Industrial assembly operations, such as those found in the automotive, construction equipment, aerospace and farming equipment industries, have relied on the common "click" wrench tools for the verification of properly secured fasteners for many years. Those skilled in the requisite art will appreciate that various examples of existing solutions can be found here https://belknaptools.com/preset-torque-wrenches/standard-interchangeable-drive-preset-torque-wrenches/, U.S. Pat. No. 10,688,629, each of which is herein incorporated by reference as if presented in their respective entireties.

However, there are many potential pitfalls the manufacturers have experienced when trying to mistake proof their operations using the current "click" wrenches on the market. For example, one of the main considerations is the ability to confirm that the torque check process was performed. This usually involves some sort of signal back to a control system to verify the tool operation. In the recent past, this was accomplished by some manufacturers through the addition of a simple mechanical switch to the internal click mechanism.

Current solutions in the field of intelligent tool systems are unable to track if any adjustments are erroneously made to the tool itself or if the tool was sending signal even though desire torque was not achieved. Likewise, current tool solutions lack quality assurance testing to ensure that the mechanical "click" measurement has not been compromised. Existing tool devices are not configured to allow a user or manufacturer to assess if an operator over-rotated the tool beyond the desired click point. For example, existing tools are unable to determine if additional torque has been applied to the fastener over what was intended or specified. Furthermore, existing systems do not have the ability to monitor the tool remotely to observe performance, or tie measurements made by the tool into PLC based control or PC based data acquisition systems.

Thus, what is needed in the art are tool solutions that overcome these problems in a manner that provides users with effective information about tool operations. What is also needed are tools that are able to communicate information about its function to remote monitors or datastores for access, evaluation and retention.

SUMMARY OF THE INVENTION

In accordance with broad aspects, an intelligent torque application tool is provided. In one implementation, the torque application tool comprises a tool body, the tool body having a torque selection mechanism configured to allow a user to select a predetermined amount torque to be applied to a workpiece; a first sensor assembly configured to receive force exerted by the torque selection mechanism and output one or more values corresponding to the amount of force received; a torque threshold device, configured to be in a first state prior to the delivery of the pre-determined amount of torque to the workpiece and a second state once the pre-determined amount of torque has been delivered, the torque threshold device configured to receive force from the first sensor assembly; a second sensor assembly configured to measure a deformation of the tool body and configured to receive force from the torque threshold device. The torque application tool has an exchangeable head attachment feature allows the use of ratchet devices, or wrench fittings suited to the specific part to be driven. The application tool also includes a processor configured by code executing therein and operative to receive simultaneously a set of measurement values from the sensor-1 assembly while torque is applied to the workpiece while receiving a set of measurement values from the second sensor-2 assembly while torque is applied to the workpiece; and determine, based on a comparison of the first and second data sets if torque has been applied to the workpiece in excess of the pre-determined amount.

DETAILED DESCRIPTION OF CERTAIN EMBODIMENTS OF THE INVENTION

By way of overview and introduction, the present disclosure relates to systems, methods and computer implemented products for providing an improved torque application tool for delivering or verifying precise torque to a workpiece. By way of non-limiting example, the present approach uses a combination of at least a load cell sensor and a strain gauge sensor to provide near real time and real time data to a microprocessor for evaluation of the torque applied to a work piece. The microprocessor is further configured to communicate data obtained from the at least two sensors to a remote data monitoring, storage or analysis platform. In one or more implementations, the data obtained by the microprocessor from the at least two sensors include the ability to track if any adjustments are erroneously made to the torque application tool itself or if the torque application tool is configured to send an incorrect signal that corresponds to the amount of torque applied to a workpiece. Furthermore, the microprocessor is configured to have the ability to monitor the torque application tool remotely to observe performance, and/or tie into PLC based control or PC based data acquisition systems. Additionally, the microprocessor is further configured to determine, based on current and/or historical data sets, whether the torque application tool has been over-rotated with respect to the workpiece such that the tool has applied torque beyond the desired "click" point and over the desired maximum torque limit.

For ease of explanation, the term "click" point refers to a pre-set or predetermined torque setting for a static, or adjustable torque delivery tool, such as a torque wrench. Those possessing an ordinary level of skill in the requisite art will appreciate that for ease of explanation, a torque wrench providing the present improvements is depicted. However, other tool configurations are envisioned and understood to include the ability to determine the angle of fastener rotation, among other characteristics.

For ease of explanation, the foregoing examples refer to a torque application tool. However, those possessing an ordinary level of skill in the art will appreciate that the foregoing elements can be incorporated into other force application tools, hardware and machinery.

Figure 1:
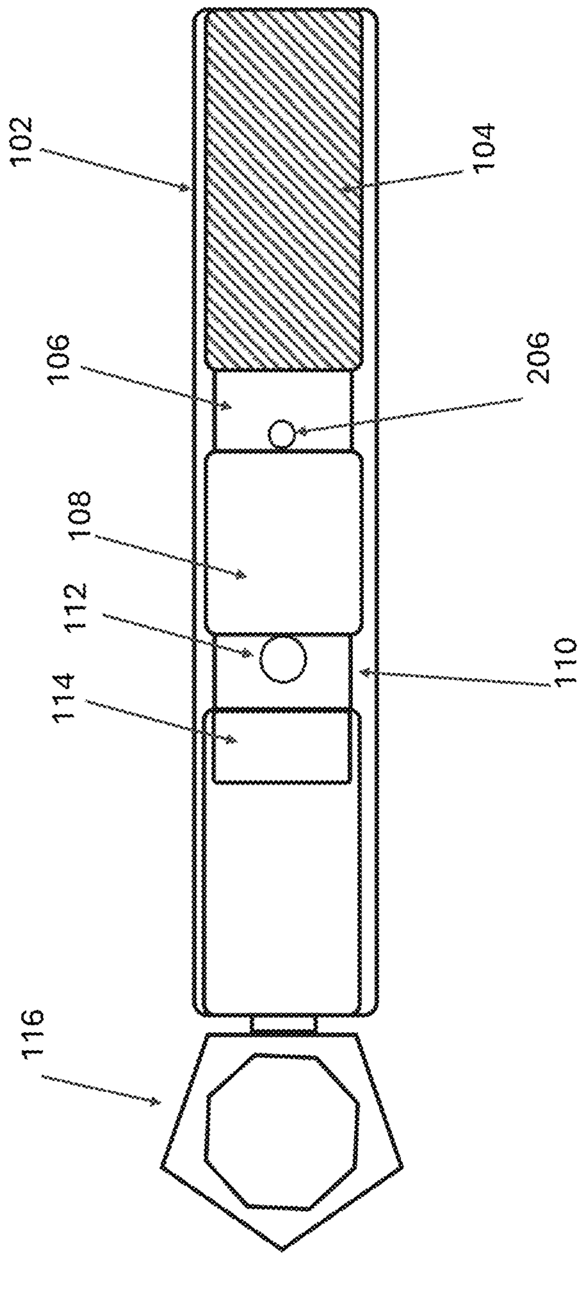
FIG. 1 is a schematic illustration detailing particular elements of the described torque application tool.

Turning now to FIG. 1, a torque application tool is provided. In one implementation the torque application tool provided is a torque wrench. As shown in FIG. 1, the torque wrench 100 includes an encasement body 102. In one or more implementations the encasement body 102 is configured to contain one or more discreet sub elements. As shown, the encasement body 102 includes a main shaft 102 connected to a spring 104. In turn, the spring 104 is configured to apply pressure to a load cell sensor 106. The load cell sensor 106 is further configured to be in direct contact with a cam 108. As shown in further detail of FIG. 1 the cam 108 is contact with a pawl 112. Furthermore, one or more strain gauge sensors are located proximate to the pawl 112.

Here the one or more strain gauge sensors can incorporate a bending beam torque sensor element. In will be appreciated bending beam torque sensors or other load cells include one or more transducers that convert force or weight applied to the load cell into an electrical signal by way of strain gauges. When a load is applied, the body of the load cell will flex and the strain gauges, strategically positioned and secured to the surface of the load cell will also stretch or compress alongside the main body. Such movement alters the electrical resistance within the strain gauge and leads to a change in the voltage across the circuit. This effect is proportional to the initial force or weight, allowing it to be calculated.

The pawl 112 is configured to be in contact with a click arm wear pad 114. The click arm wear pad 114 is an integral part of the click arm and the click arm assembly (Items 114 and 115) further communicates with a ratchet assembly 116, or other fastener specific head attachments that extends to the end of the encasement body and connects to a torque application head for applying torque to a workpiece.

In operation, the described click-wrench elements work in connection with one another to deliver or verify a predetermined amount of torque to a workpiece. For example, and in no way limiting, the encasement body 102 includes a dial, screw or pre-set indicator allowing the user to set the desired torque to be delivered to a work piece. This presetting element (implemented as a dial, screw or selector not shown in FIG. 1) compresses the torque spring 104. This force is traditionally transmitted to a cam assembly, such as cam 108. The cam assembly 108, in typical operations, functions as an anti-windup device or other mechanism configured to prevent the spring 104 from interacting directly (such as by preventing drag) with the encasement body 102. In common torque wrench arrangements, a pawl 112 is positioned between the cam 108 and the ratchet assembly (torque delivery element) 116. The cam 108 is used so that the pawl 112 will be affected only by the force applied by the spring 104 during operation. Once a user or operator engages the torque wrench with the workpiece, the rotational force is applied to the ratchet assembly 116 and transferred to the pawl 112. Once the turning force applied to the pawl 112 by the ratchet assembly 116 is sufficient to overcome the force applied by the pre-determined spring 104 on the cam 108, the pawl 112 is able to rock to one side, thus producing an audible click and tactile sensation to the user. However, this click function does not then prevent further torque from being applied to the workpiece by the torque wrench/operator. Instead, the indication that the correct torque has been applied is given solely by the operation of the pawl 112 interacting with the encasement body 102 and click arm assembly.

As shown with continued reference to FIG. 1, in typical systems, the break-away action of the pawl 112 provides the only indication that the desired amount of torque has been applied to the workpiece. The described improved torque device adds additional monitoring and evaluation elements to track if any adjustments were erroneously made to the torque application tool or if the torque application tool was sending a signal even though desire torque was not achieved.

As shown, the load cell sensor 106 is integrated into the mechanical arrangement such that the load cell sensor 106 is configured to monitor the pressure being exerted on the cam 108 by the spring 104. As used herein, a load cell sensor 106 is comprised of one or more sensor elements that work by converting mechanical force into output values that can be provided (such as through a wired or wireless connection) to a user or a processor for analysis or evaluation.

In one implementation, the load cell sensor 106 is one or more of a hydraulic load cell, pneumatic load cell, and strain gauge load cell. In one particular implementation, the load cell sensor 106 is configured to output measurement values corresponding to the amount of mechanical force applied to the load cell 106. The output measurement values can be transmitted by a wireless or wired connection to a microprocessor, display device, or remote computer configured to communicate with the load cell sensor 106. For example, the load cell sensor 106 includes a wired linkage to one or more electronic components that permit the transmission of the measured signals to a processor configured (such as through one or more software modules) to receive and evaluate the measurements made.

Figure 2:
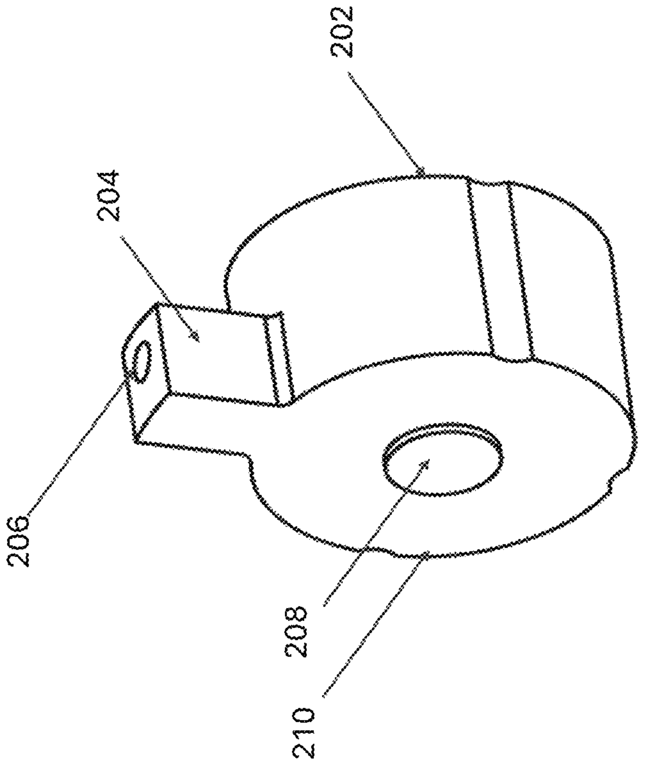
FIG. 2 is a schematic diagram of a particular element of the described torque application tool.

As shown in more detail of FIG. 2, the load cell sensor 106 is configured in a form factor consistent with being incorporated into the encasement body 102. The form factor includes a spring side 202 and a cam side 210. The spring side 202 is configured to receive the force generated by the spring 104 and apply pressure to the load cell sensor against the cam 108, which is configured to abut the cam side 210. The load cell contact point 208 is configured to translate this force into a digital signal for output to a user or processor. For instance, the load cell wiring access port 206 is configured to pass signals, via one or more electrical contacts or leads to a processor or display device, that are generated when the load cell sensor 206 is pressed against the cam 108. As further shown, the load cell sensor form factor is further configured with an anti-rotate element 204. This element is to prevent the load cell sensor from translating the rotation of the spring when under compression to the cam 108. As shown in the illustration of FIG. 2, the load cell 200 is depicted as a cylindrical load cell. However, those possessing an ordinary level of skill in the requisite art would appreciate that the load cell can take any form necessary to perform the functions described herein.

As shown in FIG. 1, the addition of a load cell 106 into the mechanical system that controls the click action provides the ability to monitor the health of the mechanics of the click mechanism as it functions. The load cell 106 monitors the spring pressure being applied to the cam and can be used as a check against the operation of the audible "click" cue that, in normal operation, would indicate that the adjusted torque has been reached.

Furthermore, the positioning of the load cell sensor 106 in the mechanical torque application apparatus allows data to be generated that corresponds to the operation of the device. For example, the load cell sensor 106 is configured to output one or more data values indicative of whether the operator performed the torque process though completion, thus indicating if the user reached the desired torque level during a torque application event. This output data, in turn, allows for monitoring of the load being exerted by the spring 104.

It will be appreciated that using a signal from only a shaft mounted sensor can result in readings that appear to be related to the click function, but really are "bumps" in the readings. For example, the measurement values provided by the cell load sensor will momentarily change when the pawl 112 rotates. However, such a change in measurement may not be caused by the pawl 112 rotating. Thus, in one or more implementations, one or more audio capture devices are used to capture the distinct sound and feel of the pawl 112 rotating. The processor is configured to capture this data and compare it to the measurement data of the load cell sensor 106 so as to confirm that the sensor measurement value and the mechanical click function occurred within a pre-set duration (such less than 100, 50, 25, 10 or 5 milliseconds) of one another.

In addition, having the load cell sensor 106 located between the spring 104 and the cam 108 provides a constant, real-time stream of force measurements.

Returning to FIG. 1, a second sensor is also incorporated into the torque application tool to monitor additional forces encountered during a torqueing event. For example, a second sensor is mounted on the handle between the ratchet assembly 116 and the cam 108 to provide the ability to monitor the force exerted on the encasement body 102 during a torque application process. In one arrangement, the second sensor is a strain gauge configured to output data corresponding to the amount of force applied to various elements thereof. In another implementation the second sensor is a MEMMS (micro-electro-mechanical) device. In a further implementation, the second sensor incorporates one or more gyros or other devices for the detection of the fastener part angle of rotation. By providing these data measurements to a user or processor, a user can be alerted to an operational error.

For example, the measurements of the second sensor can be used to determine if force is still being applied to the workpiece after the pre-determined amount of torque has already been applied. Such a mistake proofing system utilizes the sensor data of the load cell sensor 106 as well as the second sensor to detect and evaluate an over-tightening condition for a given workpiece. For example, the one or more second sensors are used to determine if the torque applied to the workpiece is beyond the configured limits. In one or more further implementations, a second, or further additional, sensor can be added to provide feedback on the amount of rotation of the fastener occurred during the torquing process.

In a particular implementation, the force sensor(s) described herein are used to measure the force applied, to or by, the torque application device. For example, the second or an additional sensor is one or more pressure sensors that are internal to the torque application device described in FIG. 1, or a force application device integrating the components described herein. Here, such pressure sensors are used to measure force in a linear way, such that the sensor outputs a value corresponding to the amount of force applied to the force application device and transmitted to a workpiece. In an additional configuration, a displacement sensor, such as LVDT (linear variable differential transformer) can be used in conjunction with the force (i.e. pressure) sensor or other sensors. For instance, where the tool described herein is used to apply force to a workpiece, like a roller, the second or additional sensor is configured to generate a value that corresponds to the amount of pressure applied to the workpiece.

A third sensor or additional sensor (depicted as sensor N of FIG. 4), is optionally coupled to the force application tool, and is used to measure the displacement of a portion of the tool when such force or pressure is applied. The data values generated by these sensors are used by a suitably configured processor to evaluate if the required amount for force (i.e. pressure) has been applied to a given workpiece. For instance, the suitably configured processor evaluates that data generated by the force sensor against one or more preset values. Where the measured value is not within a pre-determined range for the preset value (such as within _+, 1, 5, 10 or 15%), an alert is generated to the user.

In a further implementation, one or more sensors described herein are configured to provide a linear force sensor so as to measure linear force applied against the force application tool and compare such measurements to one or more preset or predetermined values.

Additionally, the processor is configured to compare the values obtained from the displacement sensor to the expected displacement values. Such expected displacement values can be correlated to specific amounts of force applied to a given tool. Where the processor identifies variance between the measured values or expected values for the pressure and displacement sensors, an alert can be generated. For example, a human-perceptible alert or alarm device, such as a speaker, flashing light, vibrator, or other element is activated to provide an alert to the user.

Likewise, a data management or user management system is configured to receive the data from the torque or force application tool. The received data is then used to update a database of records relating to one or more of the particular workpieces and operator(s). Such data can be used to indicate that this specific workpiece did not receive the pre-determined amount of force. In this way, corrective action can be taken, either by informing the operator that more work is needed, or the work done was not as specified.

Figure 3:
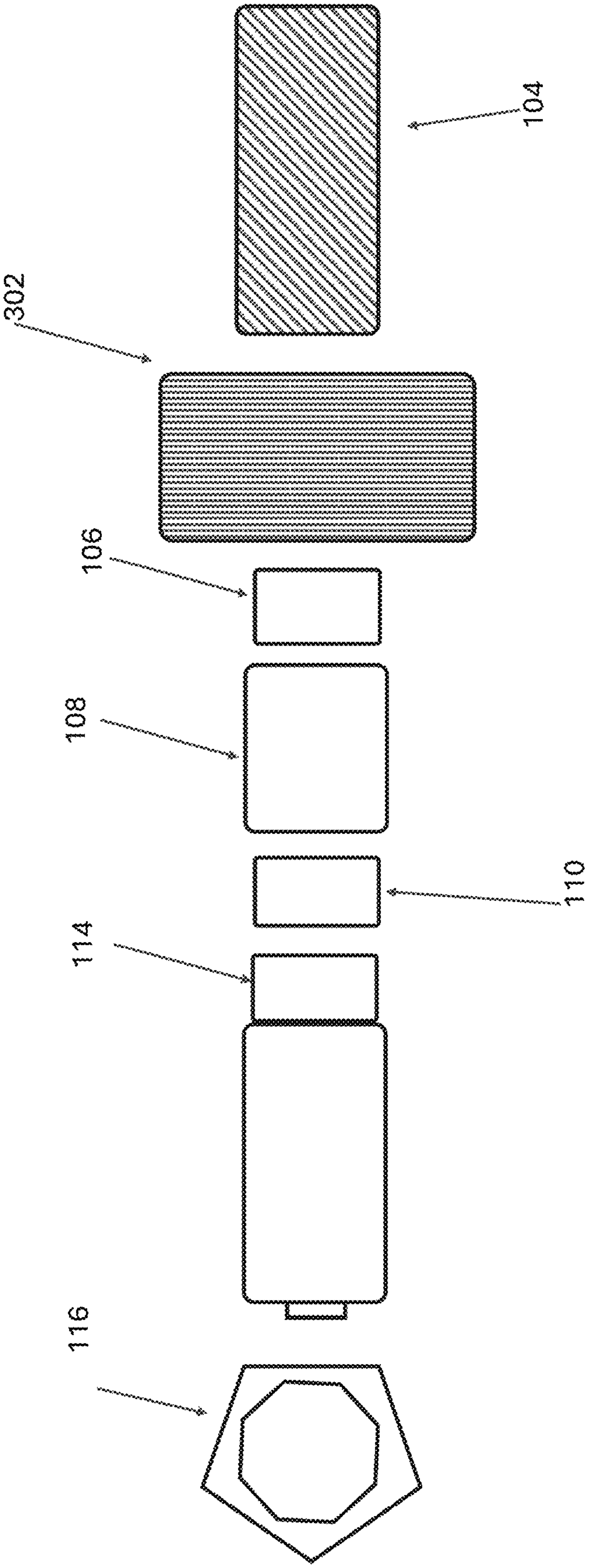
FIG. 3 is an exploded illustration of a particular embodiment of the described torque application tool.

As shown in FIG. 3, a processor or computer 302 is utilized to capture data generated by the at least two sensors and use that captured data to provide real-time information to a user or manager of the torque application tool. For instance, a computer or processor 302 that incorporates a wireless communication protocol (i.e. WiFi, Bluetooth, Zigbee, etc.) and multi-channel controller is used to capture and process data from the sensors. Such a data processor (such as processor 302) can be configured by one or more software modules executing as code to provide the functions for reading the sensors and handling the data as described. For instance, the processor 302 is configured to send usage data via the wireless interface such that third-party remote users are able to monitor the torque application tool remotely in order to observe performance of the torque application tool in real time.

In one implementation, such remote viewing of the operation of the torque application tool is accomplished via a custom software module installed at a remote computer. However, in alternative implementations, the torque application tool is able to provide data relating it its performance available via a standard PC, or mobile web browser. In a further implementation, the processor 302 of the torque application tool is configured to send data on the sensor measurements to a local processor (such a local computer accessible on an intranet, a wirelessly connected mobile device, or other computing device) that allows for the display of usage data in connection with the use of the torque application tool.

Figure 4:
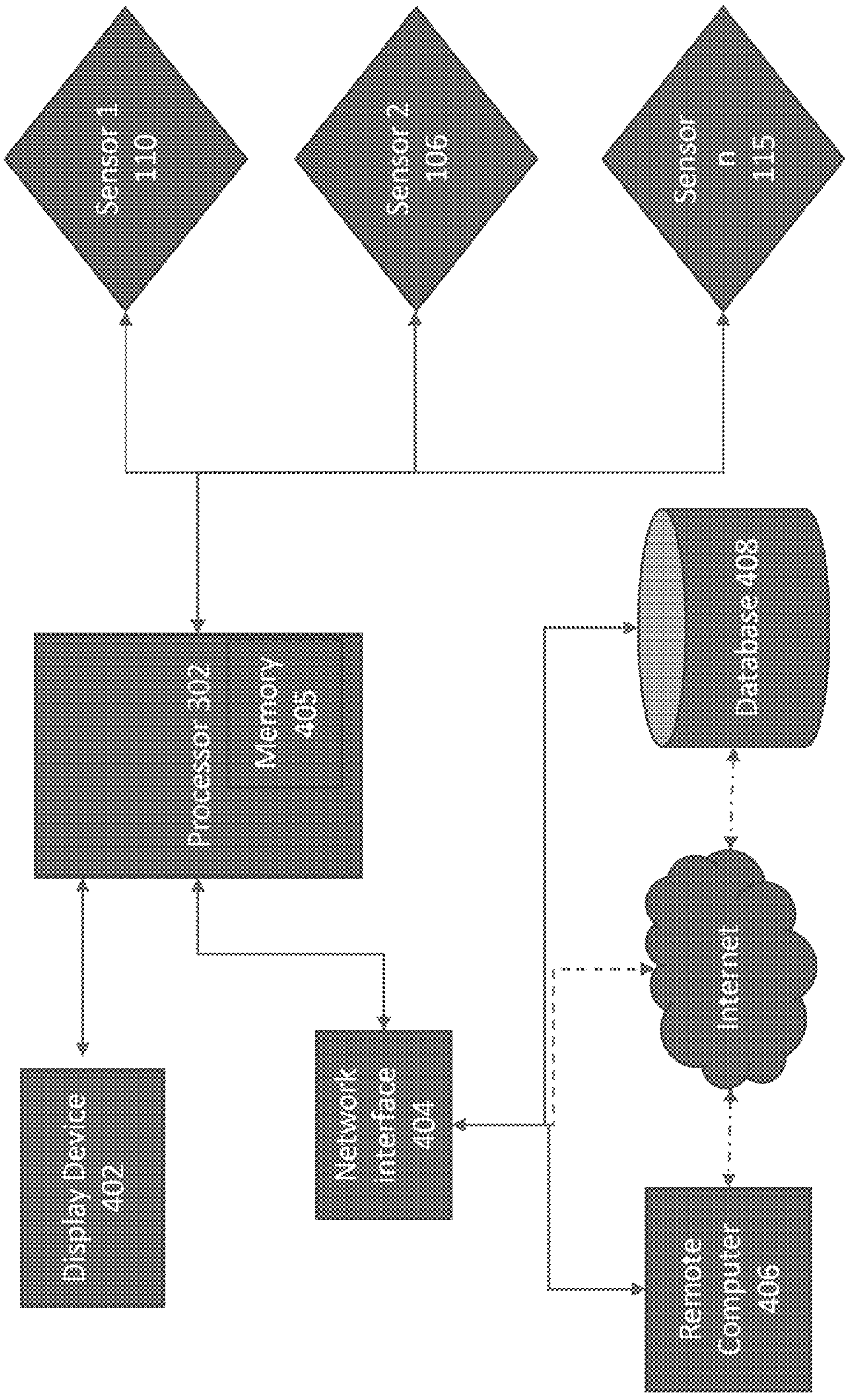
FIG. 4 is a component diagram of particular elements of an embodiment of the described torque application tool.

As shown in FIG. 4, the processor 302 is configured to receive data values generated by at least two sensors (i.e. sensor 110 and sensor 106). Additionally, the processor 302 is configured to exchange data with one or more network interfaces 404 that allow for data to be directed to one or more remote systems, such as a database 408 or a remote computer 406. In one implementation, the measurements obtained or processed by the processor 302 are sent by a direct connection to the remote systems. However, in one or more alternative implementations the network interface 404 is configured to send direct or processed measurement data to a remote system using a network connection, such as the Internet. Here, data acquired and/or processed from the sensor measurements is sent to one or more remote servers, such as an enterprise server, cloud server or other data processing and routing platform.

In one configuration, the processor 302 is a portable computing device such as an Apple iPad/iPhone® or Android® device or other commercially available mobile electronic device executing a commercially available or custom operating system, e.g., MICROSOFT WINDOWS, APPLE OSX, UNIX or Linux based operating system implementations. In other embodiments, the processor 302 is, or includes, custom or non-standard hardware, firmware or software configurations. For instance, the processor 302 comprises one or more of a collection of micro-computing elements, computer-on-chip, home entertainment consoles, media players, set-top boxes, prototyping devices or "hobby" computing elements. The processor 302 can comprise a single processor, multiple discrete processors, a multi-core processor, or other type of processor(s) known to those of skill in the art, depending on the particular embodiment.

In one or more embodiments, the processor 302 is directly or indirectly connected to one or more memory storage devices (memories) to form a microcontroller structure. The memory is a persistent or non-persistent storage device (such as memory 405) that is operative to store the operating system in addition to one or more software modules. In accordance with one or more embodiments, the memory comprises one or more volatile and/or non-volatile memories, such as Read Only Memory ("ROM"), Random Access Memory ("RAM"), Electrically Erasable Programmable Read-Only Memory ("EEPROM"), Phase Change Memory ("PCM"), Single In-line Memory ("SIMM"), Dual In-line Memory ("DIMM") or other memory types. Such memories can be fixed or removable, as is known to those of ordinary skill in the art, such as through the use of removable media cards or modules. In one or more embodiments, the memory of the processor 302 provides for the storage of application program and data files. One or more memories provide program code that the processor 302 reads and executes upon receipt of a power-up, start, or initiation signal. The computer memories may also comprise secondary computer memory, such as magnetic or optical disk drives or flash memory, that provide long term storage of data in a manner similar to the persistent memory device 405. In one or more embodiments, the memory 405 of the processor 302 provides for storage of application programs or modules and data files when needed.

As shown, memory 405 and persistent storage 408 are examples of computer-readable tangible storage devices. A storage device is any piece of hardware that is capable of storing information, such as, data, program code in functional form, and/or other suitable information on a temporary basis and/or permanent basis. In one or more embodiments, memory 405 includes random access memory (RAM). RAM may be used to store data such as the venue data in accordance with the present invention. In general, memory can include any suitable volatile or non-volatile computer-readable storage device. Software and data are stored in persistent storage 408 for access and/or execution by processors 302 via one or more memories of memory 405.

In a particular embodiment, persistent storage (database) 408 includes a magnetic hard disk drive. Alternatively, or in addition to a magnetic hard disk drive, persistent storage 408 can include a solid-state hard drive, a semiconductor storage device, read-only memory (ROM), erasable programmable read-only memory (EPROM), flash memory, or any other computer-readable storage devices capable of storing program instructions or digital information.

The database 408 may be embodied as solid-state memory (e.g., ROM), hard disk drive systems, RAID, disk arrays, storage area networks ("SAN"), network attached storage ("NAS") and/or any other suitable system for storing computer data. In addition, the database 408 may comprise caches, including database caches and/or web caches. Programmatically, the database 408 may comprise flat-file data store, a relational database, an object-oriented database, a hybrid relational-object database, a key-value data store such as HADOOP or MONGODB, in addition to other systems for the structure and retrieval of data that are well known to those of skill in the art.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications or network interface unit 404, in these examples, provides for communications with other subsystems or devices. In an embodiment, communications unit 404 may provide appropriate interfaces to the Internet or other suitable data communications network to connect to one or more servers, resources, API hosts, or computers. In these examples, communications unit 404 may include one or more network interface cards. Communications unit 404 may provide communications through the use of either or both physical and wireless communications links.

In one or more implementations, the display device 402 is a screen, monitor, display, LED, LCD or OLED panel, augmented or virtual reality interface or an electronic ink-based display device.

Those possessing an ordinary level of skill in the requisite art will appreciate that additional features, such as power supplies, power sources, power management circuitry, control interfaces, relays, interfaces, and/or other elements used to supply power and interconnect electronic components and control activations are appreciated and understood to be incorporated.

In one or more implementations, the device described herein also includes one or more wireless charging devices.

In a particular implementation, the wireless charging devices include one or more wireless power receiving antennas or pads. These wireless antennas are configured to receive power from a base station or transmitter. The power received from such a transmitter can be routed, using one or more power controllers, to a power storage device or to one or more devices requiring power to function. For example, the components of the device described herein can be directly powered by a wireless power interface.

In connection with certain embodiments described herein, the processor 302 is configured by one or more modules or submodules to receive and process data obtained from the sensors. The results of the processing are provided to the user via the display device 402. In another configuration, a human perceptible alert device is provided to provide an alert to a user. For instance, the display device 402 is configured to display data generated by the processor 302 that corresponds to a failure or fault condition during the operation of the torque application tool. The display can be fit directly to the tool, or remotely, dependent on user needs. For instance, the processor 302 is configured to receive data measurements from at least the load cell sensor 106, the strain sensor 110, and optionally, one or more additional sensors. The processor 302 is configured by one or more software modules to convert the signals provided by the sensors into values or data that can be processed or manipulated according to one or more preset instructions, functions, formula or other evaluative criteria.

In one or more particular implementations, the processor 302 is configured by one or more software modules to evaluate the sensor data obtained from the at least two sensors. Using this sensor data, the processor 302 is configured to determine if any adjustments were erroneously made to the torque application tool. For example, the values obtained from the load cell 106 are compared to a user supplied anticipated torque value. Where the values are not within a pre-determined range of one another, the processor 302 is configured to determine that the tool did not apply the desired torque and output an indication to a user providing notification of the error state. Likewise, the user of the torque application tool is able to check the accuracy of the load sensor by using one or more calibration modules to evaluate the measurement data during a known application of torque. Here, if the sensor indicates that the amount of torque delivered is not consistent with the independent evaluation of the amount of torque delivered, the user will become aware that the sensor is mis-calibrated or there is a fault in the measurement process.

In an alternative configuration, the processor 302 is configured by an over-rotation module to determine if the user is over rotating the torque application tool. For instance, the processor 302 is configured to monitor the strain gauge sensor (sensor 110) once the load cell sensor (106) has measured that the amount of torque selected has been applied. For example, where the load cell 106 measures that the desired amount of torque has been applied (for example by noting a break in the consistent measurement values that corresponds to the pawl 112 rotating) and the user continues to rotate the torque application tool, the strain gauge will continue to output measurement values. The processor is configured to receive these measurement values and determine that the user is over rotating the torque application tool. In response, the processor 302 is configured to produce an alert to the user indicating that the torque application process should be terminated. For instance, though one or more audio or visual cues (such as through an integrated speaker, LED, lamp, or transducer not shown) the processor 302 is configured to provide a warning to the user.

In yet a further implementation, the processor 302 is configured by one or more software modules to monitor both the spring load sensor and the cell load sensor in order to simultaneously compare the measurements. For example, the processor 302 is configured to monitor the sensor measurements and determine if the measurements made by the spring load sensor are outside a pre-determined range of values for the cell load sensor during application of torque to the workpiece. For example, where the processor 302 determines that the spring sensor measurement value varies greatly (such as greater than 5%, 10%, 15%, 20% or 30%) from the cell load sensor, or the expected values measured during the calibration process, the processor 302 is configured by one or more software modules to generate an alert or alarm. In one implementation, the alert is generated on the torque application tool itself, via the display device or other human perceptible alarm. In another implementation, the processor 302 is configured to send the measurement data, and/or additional information (including an alert flag) to a remote system for further analysis or storage. In this way, a profile or record of fault conditions, sensor failure or operator failure can be generated.

In a further implementation the processor 302 is configured to stream data during operation to one or more remote systems for real time monitoring. For instance, the processor 302 is configured to send measurement values directly to a local or remote system for constant evaluation of the torque application process. In one or more implementations, the torque application tool is configured with an IP address to allow for the individual communication with a given torque application device. In an alternative configuration, the torque application device is configured to send a data packet containing usage information to a remote processor or computer 406. For example, the torque application device is configured to send a data packet upon completion of a torque cycle. In an alternative implementation, the processor 302 is configured to send real time data relating to the operation of the torque application device in real-time to one or more remote processors 406. For example, real-time measurements of the torque application device are transmitted to a remote database during operation. In an alternative configuration, the torque application device is configured to send data regarding usage after a pre-set duration of time after use. For example, upon application of torque, the torque application device of a processor thereof) is configured to send data relating to the usage of the device to one or more remote data processors.

In a further implementation, a remote database (such as database 408) is configured to receive the data from the torque application tool and store that data for further use. In one implementation, a profile of a user can be created though such data measurements so that performance can be tracked across work sessions, or operators.

In a further implementation, the processor 302 is able to access data from one or more remote systems for evaluation by a user. For example, a user can review operations made by the torque application tool in prior work sessions. Likewise, the user is able to remotely stream the current work sessions for use and analysis. Another example might be, the user is able to have the processor 302 stream data to a local remote user interface, such as a smartphone or PC via a wired or wireless connection. Using such an interface, the user is able to view the torque/angle/time data being generated as the torque application tool is in use.

In a further implementation, the torque application tool is configured to implement an automatic adjustment feature. In one or more further implementations, the torque application tool includes one or more of a motor, such as a servo motor, or a leadscrew system. In a particular implementation, the motor, leadscrew system or other actuation element is configured to actuate the adjustment screw. In one particular implementation, the processor 302 is configured to evaluate the torque output. For instance, the processor 302 is configured by one or more torque monitoring modules to evaluate the stress on one or more spring elements within the torque application tool. Here, such evaluation is based on measurements obtained from one or more of the sensors integrated into the torque application tool. By way of non-limiting example, the torque monitoring modules are configured to receive data from one or more strain or spring gauges incorporated into the torque application tool. In a particular implementation, the torque monitoring modules configures the processor 302 to use Hooke's Law, or a suitable modification or extension thereof, to monitor the torque output. Based on the monitored torque output, a torque application module configures the processor 302 to activate motor or leadscrew system to rotate the leadscrew while monitoring the spring stress and adjust the torque as needed.

While this specification contains many specific embodiment details, these should not be construed as limitations on the scope of any embodiment or of what can be claimed, but rather as descriptions of features that can be specific to particular embodiments of particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in any specific sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software, or hardware products.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain embodiments, multitasking and parallel processing can be advantageous.

Publications and references to known registered marks representing various systems are cited throughout this application, the disclosures of which are incorporated herein by reference. Citation of any above publications or documents is not intended as an admission that any of the foregoing is pertinent prior art, nor does it constitute any admission as to the contents or date of these publications or documents. All references cited herein are incorporated by reference to the same extent as if each individual publication and references were specifically and individually indicated to be incorporated by reference.

While the invention has been particularly shown and described with reference to a preferred embodiment thereof, it will be understood by those skilled in the art that various changes in form and details may be made therein without departing from the spirit and scope of the invention. As such, the invention is not defined by the discussion that appears above, but rather is defined by the points that follow, the respective features recited in those points, and by equivalents of such features.

What is claimed is:

1. A torque application tool comprising:

a tool body, the tool body having:

a torque selection mechanism configured to allow a user to select a predetermined amount of torque to be applied to a workpiece;

a first sensor assembly configured to receive force exerted by the torque selection mechanism and output one or more values corresponding to the amount of force received, wherein the first sensor assembly includes a load cell configured to measure a spring pressure;

a torque threshold device, configured to be in a first state prior to the delivery of the pre-determined amount of torque to the workpiece and a second state once the pre-determined amount of torque has been delivered, the torque threshold device configured to receive force from the first sensor assembly;

a second sensor assembly configured to measure deformation force applied to the tool body;

a workpiece specific attachment configured to receive force from the torque threshold device and apply torque to a workpiece; and a processor configured by code executing therein and operative to:

receive consistent first measurement values from the first sensor assembly while torque is applied to the workpiece;

receive consistent second measurement values from the second sensor assembly while torque is applied to the workpiece;

determine, by monitoring the first consistent measurement values for a break in the measurement values, that the amount of torque applied to the workpiece exceeds the pre-determined amount of torque to be applied to the workpiece;

monitor the consistent measurement values from the second sensor assembly, wherein the second sensor assembly is configured to measure deformation force applied to the tool body as a result of torque application to the workpiece, wherein the processor is operative to maintain said monitoring after a determination, based on the first consistent measurement values from the first sensor assembly configured to measure spring pressure, that the amount of torque applied to the workpiece has reached the pre-determined amount of torque to be applied to the workpiece, and generate an alert indicating that torque application process be terminated when the monitored consistent measurement values from the second sensor assembly indicate a continued increase in deformation force after said determination that the amount of torque applied to the workpiece has reached the pre-determined amount of torque.

2. The torque application device of claim 1, wherein the second sensor assembly includes at least one strain gauge.

3. The torque application device of claim 1, wherein the second sensor assembly includes at least one bending beam torque sensor element.

4. The torque application device of claim 1, wherein at least one of the first sensor assembly and second sensor assembly is configured to wirelessly transmit measurements to the processor.

5. The torque application device of claim 1, wherein the processor is configured to wirelessly communicate with at least one remote computing device.

6. The torque application device of claim 1, wherein the processor is configured to wirelessly communicate with at least one remote database.

7. The torque application device of claim 1, further comprising a human-perceptible notification device configured to receive an activation signal from the processor.

8. The torque application device of claim 7, wherein the processor is further configured to generate the activation signal in response to a determination that the torque applied to the workpiece exceeds the pre-determined amount.

9. The torque application tool of claim 1, further comprising:

an audio capture device configured to detect an audible sound associated with the torque threshold device transitioning to the second state; and wherein the processor is further operative to:

receive audio data from the audio capture device;

compare the audio data to the first measurement values from the first sensor assembly; and confirm that the torque threshold device transitioning to the second state is coincident with a predetermined change in the first measurement values within a pre-set duration.

* * * * *